M. JACOB.
ATTACHMENT FOR CASH REGISTERS.
APPLICATION FILED MAY 26, 1911.

1,123,303.

Patented Jan. 5, 1915.
6 SHEETS—SHEET 1.

WITNESSES:
H. F. Sadgebury
J. W. Ricketts

INVENTOR
Max Jacob
BY W. H. ―――
and R. C. Glass.
ATTORNEYS

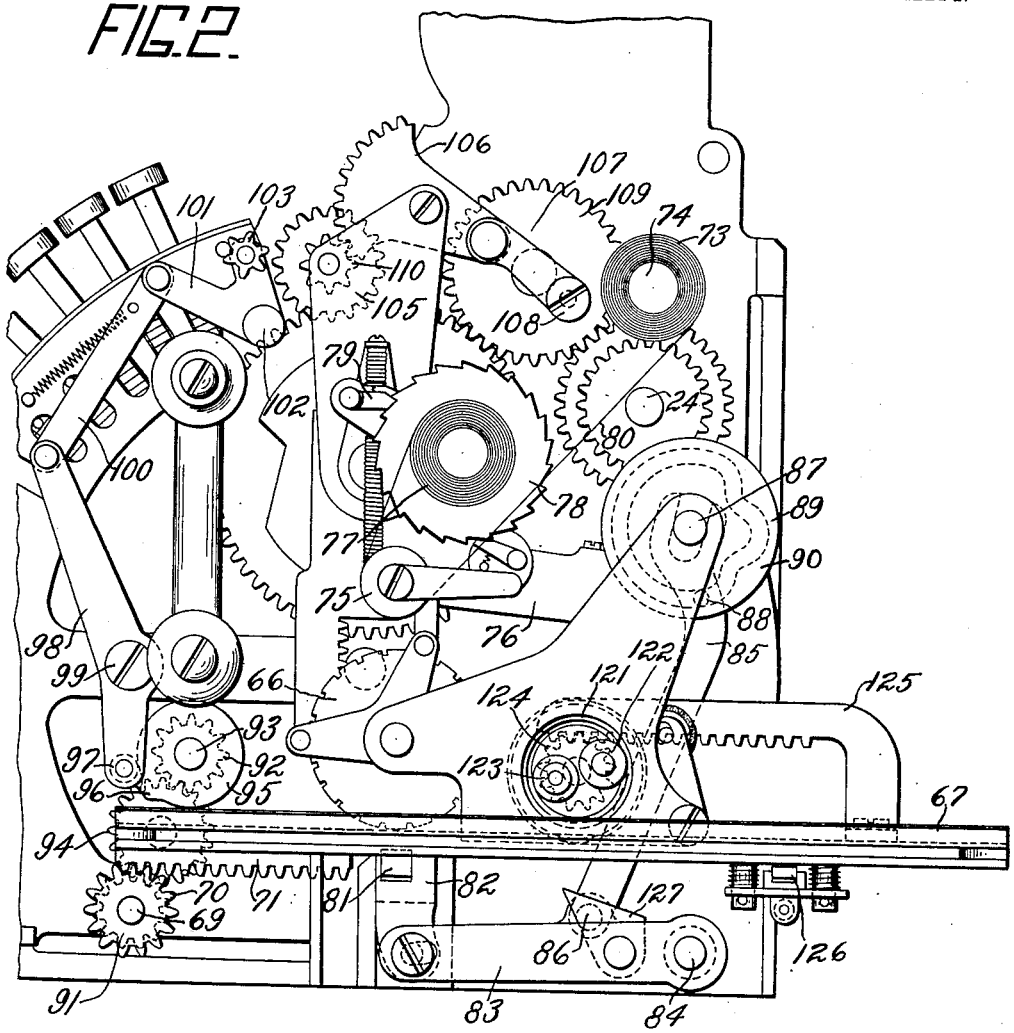

M. JACOB.
ATTACHMENT FOR CASH REGISTERS.
APPLICATION FILED MAY 26, 1911.

1,123,303.

Patented Jan. 5, 1915.
6 SHEETS—SHEET 3.

WITNESSES:
H. F. Sadgebury
J. B. Ricketts

INVENTOR
Max Jacob
BY W. H. Whigby
and R. C. Glass
ATTORNEYS

M. JACOB.
ATTACHMENT FOR CASH REGISTERS.
APPLICATION FILED MAY 26, 1911.

1,123,303.

Patented Jan. 5, 1915.
6 SHEETS—SHEET 4.

WITNESSES:
H. F. Sadgebury
J. B. Ricketts

INVENTOR
Max Jacob
BY W. H. Muzzy
and R. E. Glass
ATTORNEYS

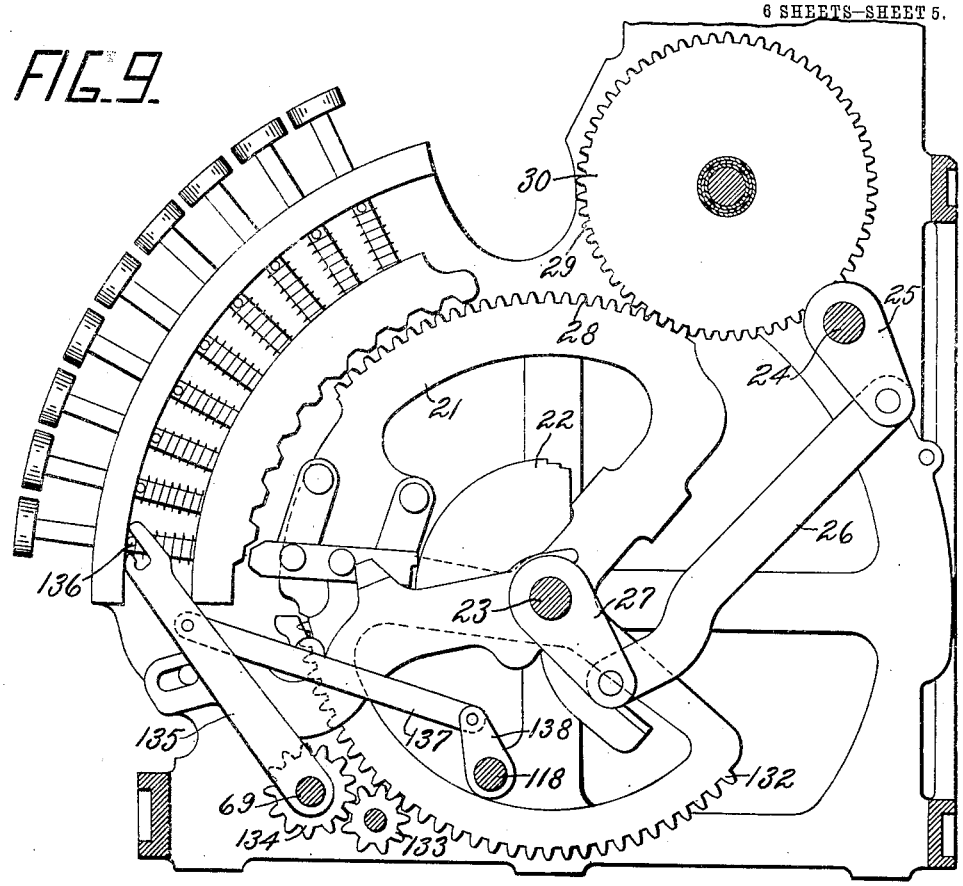
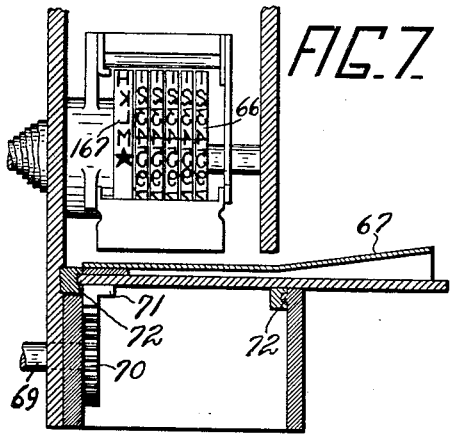

UNITED STATES PATENT OFFICE.

MAX JACOB, OF BERLIN, GERMANY, ASSIGNOR TO THE NATIONAL CASH REGISTER COMPANY, OF DAYTON, OHIO, A CORPORATION OF OHIO, (INCORPORATED IN 1906.)

ATTACHMENT FOR CASH-REGISTERS.

1,123,303.          Specification of Letters Patent.          Patented Jan. 5, 1915.

Application filed May 26, 1911.   Serial No. 629,572.

*To all whom it may concern:*

Be it known that I, MAX JACOB, a subject of the Emperor of Germany, residing at Berlin, Germany, in the Kingdom of Prussia and Empire of Germany, have invented certain new and useful Improvements in Attachments for Cash-Registers, of which I declare the following to be a full, clear, and exact description.

This machine relates to cash registers and has more particular relation to that class of registers adapted for use in classes of business in which a segregation of transactions is desirable.

The principal object of the invention is to provide, in a register of the type above mentioned, suitable mechanism for giving a complete printed record of each item of a transaction together with the total of the amounts of all of such items.

A further object is to provide totalizing means for giving at all times a separate total of items in each segregation of transactions and also means for giving a grand total of the totals of each segregation.

Another object is to provide a totalizing means for accumulating items of each transaction and also to provide means whereby when a printed record of the total of a transaction is made, the amount of such transaction will be added upon a grand totalizing means and simultaneously with such operation the accumulating or main totalizing means will be reset automatically to zero.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Figure 1:
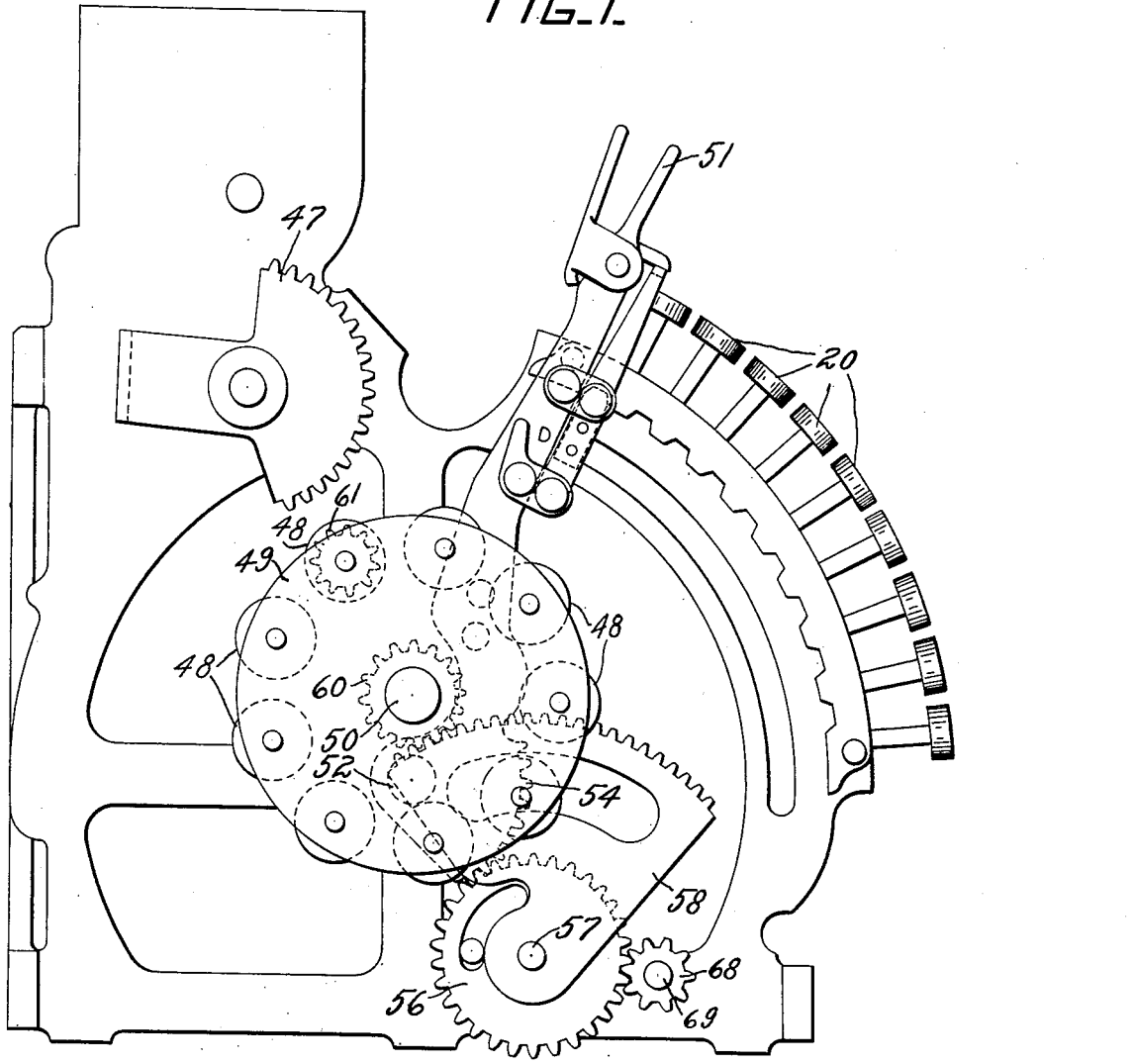
Figure 4:
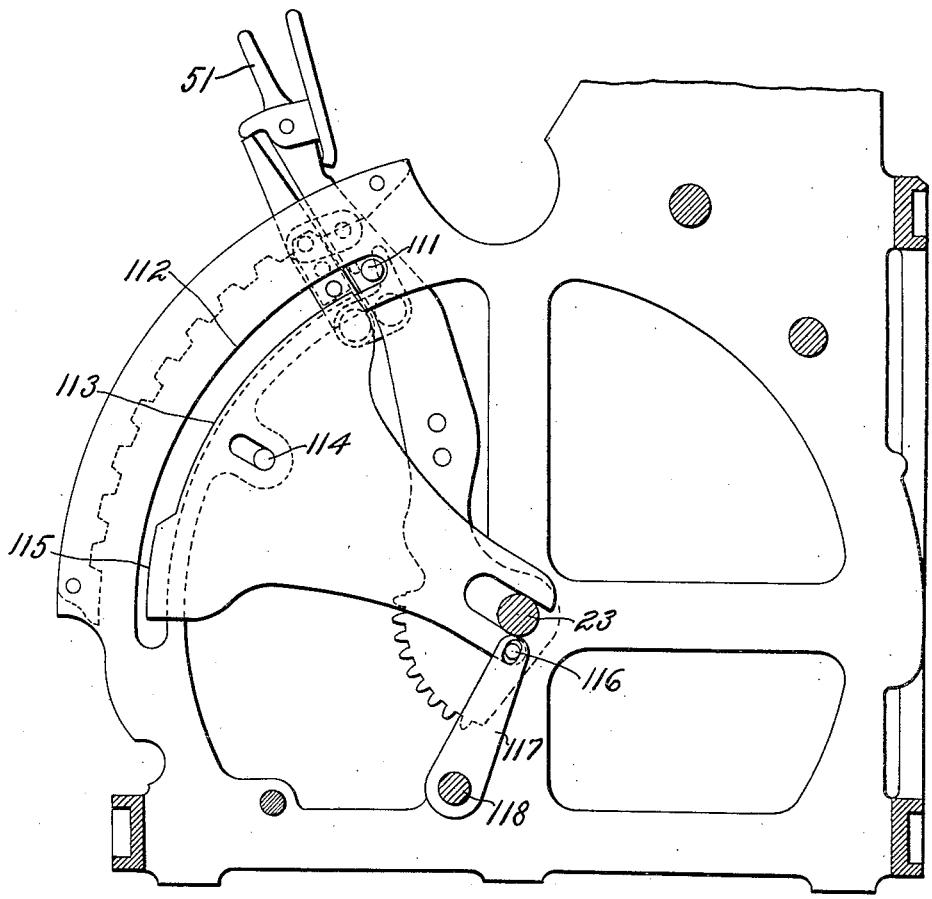
Figure 11:
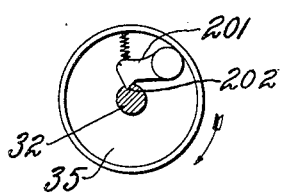
Figure 5:
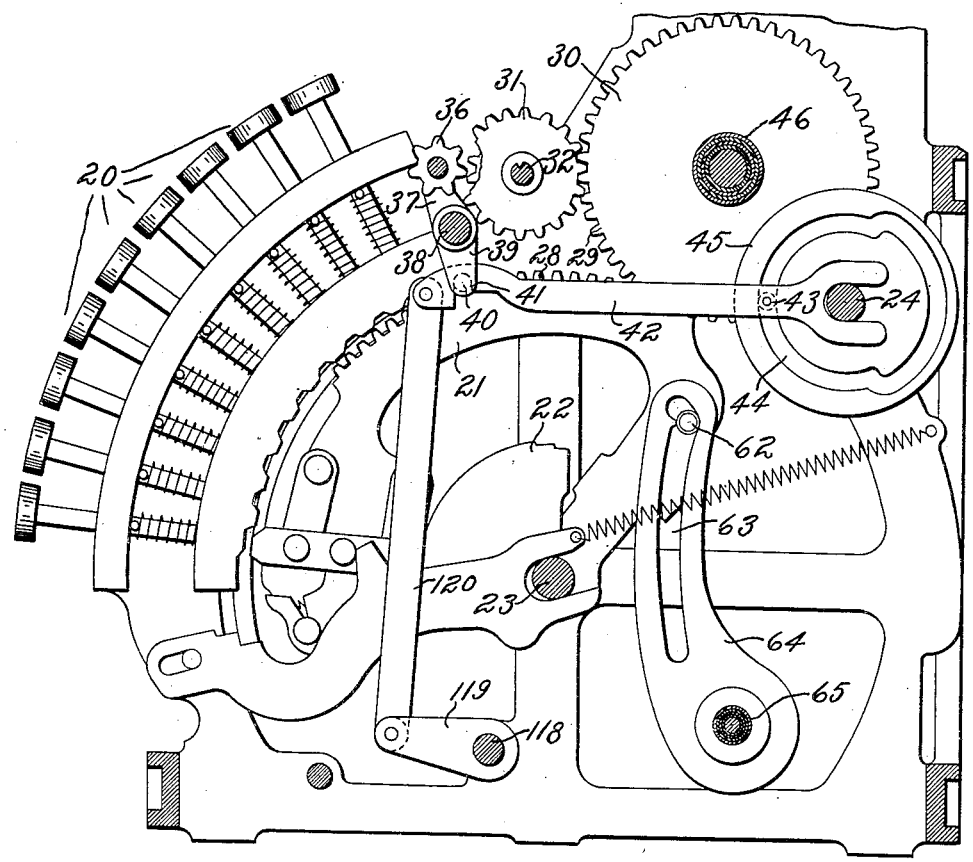
Figure 6:
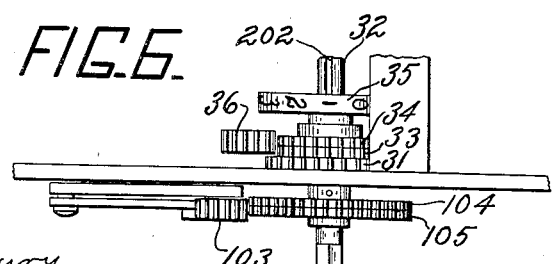
Figure 10:
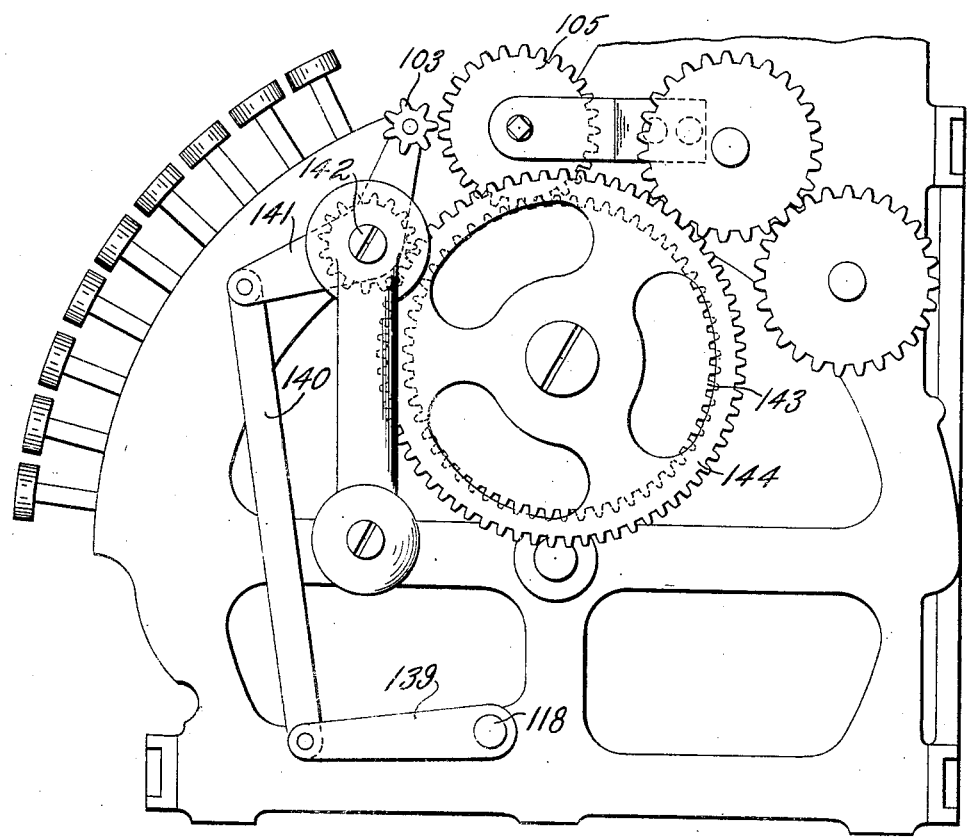

Of said drawings: Figure 1 is an end elevation of a register of a type to which the present improvements are shown as applied. Fig. 2 is an elevation of the printing mechanism for printing details and the totals of transactions. Fig. 3 is a detail of an alining device for the printing mechanism. Fig. 4 is a cross section of the register showing the modified form of mechanism for throwing out the main totalizer and rendering effective the resetting mechanism therefor. Fig. 5 is a cross sectional view showing mechanism for disabling the main totalizer. Fig. 6 is a detail view of the turn to zero mechanism for the main totalizer. Fig. 7 is a detail view of the printing mechanism. Fig. 8 shows a form of sales slip which may be used with the present construction. Fig. 9 is a modification showing the manner of applying the present invention to a register not having a setting lever such as shown in Fig. 1. Fig. 10 shows a modified form of turn to zero mechanism for the main totalizer. Fig. 11 is a detail view of one of the elements of the main totalizer and the connections for resetting the same to zero.

For convenience of illustration the invention has been shown as applied to a machine of the type shown in Letters Patent of the United States No. 938,527, issued November 2, 1909, to Edward J. Von Pein. For further convenience the machine will be shown as adapted for use in a wholesale house, but it will be readily understood that it is applicable to any class of trade in which a segregation of transactions is desired.

The operation of the machine to which the present improvements are shown as applied, is substantially the same as that of the machine shown in the above mentioned Letters Patent, but for the sake of convenience it will be briefly described as follows.

The machine comprises a plurality of banks of keys 20, any one of which keys when depressed serves as a stop for a differentially movable rocking segment rack 21 (see Figs. 5 and 9). Only one of such bank of keys 20 is shown in the figures and it will be readily understood that the several banks generally comprised in a complete machine for practical use are mere duplicates in principle and construction.

The segment 21 receives its rocking movement from a segment 22 to which it is automatically coupled and uncoupled in a manner well known in the art and fully set forth in the above enumerated Letters Patent. Segment 22 is rigidly mounted on a rock shaft 23 to which power is transmitted from a main shaft 24 through the medium of a crank 25, pitman 26 and arm 27 (see Fig. 9).

Any form of motive power may be used for rotating the main shaft 24, either a crank handle or motor being preferred.

The segment 21 is formed with teeth 28 meshing with similar teeth 29 formed on an intermediate gear 30, through the medium of which gear the differential movement of the segment 21 is transmitted to the indicating and totalizing mechanisms.

The gears 30 mesh with pinions 31 loosely mounted on a shaft 32. Rigidly mounted on the side of each pinion 31 is a smaller pinion 33 (Figs. 5 and 6). Immediately beside each pinion 33 is a companion pinion 34 which pinion 34 acts as a driving pinion for the corresponding totalizer wheel 35 of the main totalizer and in order to transmit the differential movement from the pinion 33 to its companion pinion 34 and totalizer wheel 35, there is provided a broad pinion 36 normally out of mesh with the pinions 33 and 34. The broad pinions 36 are carried by arms 37 fast on a rock shaft 38 extending across the machine. The shaft 38 is provided with a depending arm 39, which arm carries a pin 40 normally engaging a notch 41 formed in a pitman 42. The pitman 42 extends rearwardly and is bifurcated at its rear end to straddle the main shaft 24.

Carried by the pitman 42 is an anti-friction roller 43 projecting into a groove 44 formed in a box cam 45 rigidly mounted on the main shaft 24. The groove 44 of said box cam 45 is so constructed as to give the pitman 42 one reciprocation at each operation of the machine, thus causing the rocking of the shaft 38 and an engagement of the broad pinions 36 with their appropriate pinions 33 and 34. This engagement of the pinions 36 with gears 33 and 34 is effective only during the time that the segments 21 are receiving their differential adjustment, the totalizing wheels 35 thereby receiving movements to extents commensurate with the values of the keys 20 which were depressed. The totalizing means which have just been described will hereinafter be referred to as the "main totalizer" and its relation to the remainder of the machine will be hereinafter specifically set forth.

The intermediate gears 30 are keyed in any suitable manner to a plurality of nested sleeves 46 which extend to the left in the machine and carry on their outer ends a series of gear segments 47, one of which is shown in Fig. 1. The gear segments 47 are adapted to operate any one of a series of totalizers 48 carried by a rotatable frame 49 mounted to rotate on a short shaft 50. The frame 49 is capable of rotation to bring any one of the totalizers 48 into coöperative relation with the gear segments 47.

The rotation of the frame 49 is effected in the following manner. Beside the frame is a setting lever 51 pivotally mounted on a stub shaft 52 on the left hand side frame of the machine. The lever 51 is formed at its lower end with a rack 54 meshing with a pinion 56 loosely mounted on a shaft 57. The pinion 56 is rigidly connected to a rack segment 58, the teeth of which mesh with a pinion 60 rigidly connected to the rotating frame 49. It will thus be seen that when the lever 51 is moved downwardly such downward movement will effect the rotation of the pinion 56 through the medium of the rack 54 and pinion 56. This rotation of the pinion 56 will effect a movement of the rack segment 58, which in turn will effect a rotation of the frame 49 through the medium of the pinion 60.

Suitable latching mechanism of any well known form may be provided for locking the lever 51 in any one of its positions of adjustment in order to hold the adjusted totalizer 49 in operative alinement with the gear segments 47. A preferred form of such a locking means is shown in Fig. 1, a detail description of which may be had by reference to the Letters Patent above cited.

In order to establish an operative engagement between the adjusted totalizer 48 and the gear segments 47, mechanism is provided for elevating the shaft 50 so as to throw pinions 61 of the totalizers 48 into engagement with the teeth of the gear segments 47. It thus will be seen that upon adjustment of the gear segments 47 the adjusted totalizer 48 likewise will be actuated to an extent commensurate with the value of the keys 20 which were depressed.

The mechanism for elevating the shaft 50 and frame 49 is not shown in the present application, but reference may be had to the above mentioned Letters Patent and to Letters Patent of the United States to Thomas Carroll, No. 703,639, granted July 1, 1902.

The frame 49 is shown as provided with nine totalizers 48. In the use of a machine in the manner outlined hereinafter, it is desired to employ eight of such totalizers to carry out the plan of segregation of transactions. The ninth totalizer 48 is employed to give a grand total of all of the totals represented on the other eight totalizers. For convenience the eight totalizers which are employed to give the segregated totals will be referred to hereinafter as the "item totalizers", and the other, or ninth totalizer, will be known as the "grand total totalizer".

Each of the rack segments 21 carries an anti-friction roller 62 adapted to play in a cam slot 63 formed in an arm 64 (see Fig. 5).

The several arms 64 for the banks of keys 20 are keyed in any suitable fashion to a series of nested sleeves 65 which extend to the right hand end of the machine and carry on their outer ends a series of printing wheels 66 (see Figs. 2 and 7).

Each of the printing wheels 66 is provided with two sets of numerals from one to nine and zero, the like numerals of each set being located at diametrically opposite points on the periphery of the printing wheels. The two sets of numerals are provided, one for printing upon a strip of paper 80 and thus retaining within the machine a detail entry of each item recorded on the machine together with the total of each transaction; the other set of numerals printing such items of a transaction upon a sales slip inserted in the machine.

An additional type wheel 167 is provided with only one set of type, such type being positioned to print upon the detail strip 80 only, the character of the item totalizer positioned for operation in recording the items of a transaction.

The detail strip 80 passes from a supply roll 73 carried by a stub shaft 74 mounted on the main frame down about a platen roller 75 carried by a rocking printing frame 76 and thence to a receiving roll 77.

The receiving roll 77 is provided with a feeding ratchet 78 adapted to be operated by a feeding pawl 79 at each actuation of the printing frame 76. At each operation of the machine, the printing frame 76 is rocked downward to force the platen 75 and record strip 80 against the printing wheels 66 so as to cause an impression to be made upon the record strip. Upon the restoration of the frame 76 to normal position the ratchet 78 is fed the distance of one tooth so as to bring a fresh portion of the detail strip into position to receive a printed entry upon the next operation of the machine. The printing frame 76 receives its actuating movement from a cam carried by the shaft 24 but as this form of detail printing mechanism is old and well known in the art the said cam and detail construction of the printing frame have been omitted, as they form no part of the present invention.

In Fig. 8 is shown a form of sales slip which may be used with the present invention. In the present instance the machine has been designed for use by a wholesale establishment and it will be noted that the various lines upon the sales slip bear printed classes of transactions, such as, "Dry Goods and Notions", "Cigars and Tobacco", "Groceries", "Hardware", etc. These classes of transactions may be printed upon the sales slip, or, if desired, the printing wheel 167 may be made of sufficient size and design to print such class of transactions upon the sales slip simultaneously with the printing of the amounts of items of the transactions upon the slip. In the present instance, however, it is desired to have the sales slip printed in advance, merely leaving space for the printing of the amount of each item of a transaction together with the total amount of the transaction. The slip may also have a space provided for the entry of the name of the person to whom the goods are consigned, together with his address, the date of transaction and the consecutive number of the transaction, etc.

In the use of the present invention in a wholesale establishment, one of the item totalizers 48 will be assigned to each of the eight classes of transactions shown on the sales slip, while the ninth or grand total totalizer will be used as above stated, to represent the grand total of all the segregated totals.

The sales slip is placed upon an adjustable printing table 67 which is adapted to receive an adjustment simultaneous with the adjustment of the totalizer frame 49 in order so to position the sales slip relative to the printing wheels 66 to cause printing, on the proper line of said sales slip, of the amount of each item of a transaction simultaneously with the entry of such amount upon the proper item totalizer and the main totalizer.

The adjustment of the printing table 67 is effected in the following manner. The pinion 56, which is adjusted upon the movement of the lever 51 to position the frame 49, is constantly in mesh with a pinion 68 fast on one end of a shaft 69, the other end of which shaft carries a pinion 70. The teeth of the latter pinion 70 are constantly in mesh with the teeth of a rack 71 formed on the under side of the printing table. The printing table is adapted to slide in guideways 72 formed on the frame of the machine. It will readily be seen that when the lever 51 is moved downwardly to position the totalizer frame 49, the pinion 56 effects rotation of shaft 69 through the medium of pinion 68 and such rotation of the shaft 69 is transmitted to the table 67 through the medium of pinion 70. In this manner the printing table 67 receives an adjustment corresponding to the adjustment of the totalizer frame 49.

Mounted below the printing table 67 is a reciprocating platen 81 carried by a sliding platen frame 82 which is reciprocated at each operation of the machine by a lever 83 pivoted at 84 to the frame of the machine. The lever 83 receives a reciprocating movement at each operation of the machine from a pitman 85, pivoted to said lever at 86 and bifurcated at its upper end to straddle a shaft 87. The pitman 85 carries an antifriction roller 88 which plays in a cam slot 89 formed in a box cam 90, rigidly mounted upon the shaft 87. The shaft 87 receives a complete rotation at each operation of the machine being geared to main shaft 24 and the platen 81 will thus be caused to force the inserted sales slip against the printing wheels 66.

If any one transaction comprises a series of items which come under two or more of the segregations indicated on the sales slip, the operator, upon inserting a slip within the table 67, adjusts the lever 51 to a position to bring the line appropriate to the first of such segregations listed on the sales slip adjacent the type wheels. This adjustment of the lever 51 also establishes a coöperative relation between the gear segments 47 and the appropriate one of the item totalizers 48. The machine is then given an operation by means of the motor or crank handle. This effects an entry of the amount of the item upon the item totalizer and also upon the main totalizer, and also prints the amount of such item on the appropriate line of the sales slip. The operator then readjusts lever 51 to a position corresponding to the next one of the segregations involved in the transaction. This will likewise bring the desired one of the item totalizers 48 into operative position and also bring the proper printing line of the sales slip into printing alinement with the printing wheels 67. An operation of the machine then effects the entry of the amount of such item in a manner similar to the previous item, and also effects a printing of such amount upon the proper line of the sales slip. After all the items of a transaction have been so entered, the amount shown on the main totalizer will represent a total of all of the items of the transaction. The operator then moves the lever 51 to its lowermost position to bring the grand total totalizer carried by the frame 49 into coöperative relation with the gear segments 47. This adjustment of the lever 51 likewise so adjusts the sales slip relative to the printing wheels as to bring the "Total" line of the sales slip into alinement with the printing wheels 66. He then depresses keys 20 representing the total then shown by the main totalizer. The machine is then operated and the total of the transaction is thus entered on the grand total totalizer and is also printed upon the proper line of the sales slip.

Upon the transfer of an amount from the main totalizer to the grand total totalizer as just described, it is necessary to reset the main totalizer, so that it may start at zero reading at the next transaction. In order to reset the main totalizer to zero upon the final operation of the machine to transfer the total to the grand total totalizer, mechanism is provided whereby the main totalizer is automatically reset to zero upon such final operation. This mechanism comprises means under control of the lever 51 whereby, when said lever is adjusted to its total position, said resetting mechanism is brought under control of the main operating mechanism of the machine.

It will be understood that the elements of the main totalizer are mounted upon the single shaft 32 of a form well known in the art, which shaft, when given a full rotation, will act to reset the totalizer elements to zero. Each of the elements of the main totalizer carries a pivoted pawl 201 spring pressed to engage a longitudinal groove 202 formed in shaft 32 when the elements are in their zero positions. (See Fig. 11). It will be noted by reference to said figure that the groove 202 is so formed as to engage and operate the pawls 201 to return all the elements when the shaft is turned in the direction of the arrow in said figure. Such a construction is old and well known in the art and will not be shown or described in detail herein as it forms no part of the present invention. The present invention comprises means for automatically giving said shaft a rotation upon an operation of the machine when the lever 51 is in its total position.

The mechanism under control of the lever 51 for effecting a resetting of the main totalizer to zero is as follows: The shaft 69 which, as before described, is differentially adjusted upon the movement of the lever 51, carries on its right hand end a pinion 91 which is adapted to actuate a pinion 92, loosely mounted on a stub shaft 93, such actuation being effected through the medium of an intermediate pinion 94. The pinion 92 is fast to a cam 95 having a short camming point 96. When the lever 51 is moved to its total position the camming point 96 of of the cam 95 is adjusted to a position to engage an antifriction roller 97 carried by a lever 98 pivoted at 99 to the frame of the machine. It will readily be seen that when the camming point 96 is brought into engagement with the anti-friction roller 97 it will cause a rocking of the lever 98 about its pivot 99. The upper end of the lever 98 is connected by a link 100 to one arm of a bell crank lever 101 pivoted at 102 and carrying on its other arm a broad idle pinion 103 (see Figs. 2 and 6). This idle pinion normally extends across the face of two companion gears 104 and 105, but is normally out of mesh with said companion gears. The gear 104 is rigidly mounted on a shaft 32 while the gear 105 is loosely carried by said shaft and is adapted to be given a single rotation at each operation of the machine by an operating gear segment 106, which receives a rocking movement at each operation of the machine from a driving pitman 107 pivotally connected at 108 to a gear 109 which forms a part of the main operating train.

The gear 109 is adapted to receive a single rotation at each operation of the machine thus effecting a reciprocating movement of the gear segment 106 and a consequent reciprocation of the gear 105 through the medium of a small pinion 110. When the lever 51 is moved to the total position, as hereinbefore stated, and the lever 98 is rocked by the cam 95 it will cause the idle pinion 103 to move into mesh with the two companion gears 104 and 105. When the machine is then operated the gear segment 106 will be reciprocated, as above stated, and the gears 105 and 104 will consequently be given a single rotation to effect a rotation of the shaft 32 to reset the elements of the main totalizer to zero. As the present invention contemplates the use of a turn to zero shaft 32 having a one-way connection only with the elements of the main totalizer, it will readily be seen that when the gear segment 106 and gears 104 and 105 are returned to normal position, the shaft 32 may also be restored to normal position without in any wise affecting the elements of the main totalizer.

In the description hereinbefore given of the mechanism for entering an amount on the main totalizer, it has been pointed out that the broad pinion 36 is rocked into engagement with companion gears 33 and 34 at each operation of the machine. This will effect an entry of the amount on the main totalizer when the rack segments 21 receive their differential adjustment. However, when the amount appearing on the main totalizer is to be entered on the grand total totalizer of the totalizer frame 49 and the main totalizer automatically and simultaneously reset to zero, it is necessary to provide mechanism for disabling the connections for moving the idle pinions 36. Otherwise, when the keys 20 are pressed in to represent the amount on the main totalizer and the machine then operated to clear the main totalizer, the consequent differential adjustment of the rack segment 21 to cause an entry of the amount upon the grand total totalizer would also enter the amount upon the main totalizer at the time said latter totalizer was being reset to zero. It will readily be seen that such an operation would have the effect of disabling the machine. By reference to Fig. 5 and the foregoing description it will be recalled that the pin 40 engages a notch 41 in the driving pitman 42. To disable the operation of the idle pinion 36 it is merely necessary to elevate the forward end of the pitman 42 so as to disengage the notch 41 from the pin 40. This disengagement is effected in the following manner: Carried by the lever 51 is a pin 111, (see Fig. 4) which extends through a curved slot 112 formed in the left hand side frame of the machine. Upon the movement of the lever 51 this pin 111 is adapted to ride down over the curved forward edge of a sliding plate 113, which is slotted at its forward end to slide upon a pin 114 carried by the frame of the machine and is bifurcated at its rear end to straddle the shaft 23. At its lower forward end the plate 113 is formed with a raised portion 115 which is adapted to be engaged by the pin 111, when the lever 51 is moved to total position, thus causing said plate 113 to be forced rearwardly. At its rear end the plate 113 carries a pin 116 playing in a slot formed in an arm 117 rigidly mounted on a rock shaft 118. The shaft 118 extends across the machine and just below the forward end of the pitman 42 carries a forwardly extending arm 119. The outer end of the arm 119 is connected by a link 120 to the forward end of the pitman 42. It will thus be seen that when the pin 111 engages the projection 115 of the plate 113, said plate is forced to slide rearwardly and by reason of its connection with the arm 117 it causes a rocking of the shaft 118 and thus raises the forward end of the arm 119. This raising of the forward end of the arm 119 causes a similar raising of the forward end of the pitman 42 and a consequent disengagement of the notch 41 from the pin 40 through the medium of the link 120. At the operation of the machine the reciprocation of the pitman 42 is therefore an idle one and the broad intermediate pinions 36 remain in normal position. The differential adjustment of the rack segments 21 then has no effect upon the main totalizer elements.

In order to print the date and consecutive number in the proper position on the sales slip, means are provided for printing such data simultaneously with the printing of the total upon said slip. The means for printing such data comprises a printing roller 121 mounted to rotate in the frame of the machine. (See Figs. 2 and 3.) This printing roller is of well known form and needs no detailed description here. It comprises a series of date and consecutive number wheels which are mounted in the printing drum, small finger knobs 122 and 123 being provided to adjust the wheels so as to print the proper date and also to reset the consecutive number wheels to zero. The printing drum 121 carries a pinion 124 and receives its rotating movement from a rack arm 125 mounted on the rear end of the printing table 67. It will thus be seen that upon the differential adjustment of the printing table 67 the printing drum will consequently be given a differential rotation. The movement of the printing drum is so timed as to bring the date and consecutive number printing type into printing position only when the printing table is in a position relative to the printing wheels 66 to cause a printing of the total upon its proper line.

An auxiliary platen 126 is slidably mounted on the printing table and is adapted to be brought into printing alinement with the printing drum 121 when the table 67 is adjusted to total printing position. When the platen 126 is so positioned, it is also brought into coöperative relation with a lug 127 carried by the lever 83 which operates the main platen 81. Then when the table 67 is in total printing position an operation of the lever 83 to effect the printing of such total will also cause the lug 127 to engage and operate the auxiliary platen 126 thus effecting a printing of the date and consecutive number upon the sales slip.

In order to aline the printing drum 121 and consequently the printing table 67 in adjusted position while the printing is being effected, the printing drum 121 is provided with a star wheel 128. Mounted to coöperate with the star wheel 128 is a bell crank lever 129 one arm of which is adapted to engage the notches of the star wheel, the other arm of said bell crank being pivotally connected to a pitman 130 which is reciprocated at each operation of the machine by an eccentric 131 rigidly mounted on the shaft 87. The eccentric 131 is so timed that during the operation of the main operating mechanism the alining arm of the bell crank 129 engages in one of the notches 128 and thus holds the printing drum 121 and printing table 67 in adjusted position.

As certain machines now on the market, which employ a form of differential mechanism similar to that which has been shown in Fig. 5, are not provided with a plurality of totalizers carried by a rotating frame similar to the frame 49 shown in Fig. 1, and have no setting lever 51, there has been shown in Fig. 9 a modified form of controlling mechanism. This controlling mechanism is placed under the control of a bank of keys similar to the ordinary keys 20, these keys, however, not effecting an operation of the main totalizer but merely controlling a differentially movable rack segment 21, which, in the present instance, has been shown as employed for setting an intermediate gear 30, which, as before mentioned, also controls an indicating mechanism. The rack segment 21 in this instance is also employed for differentially positioning the printing table 67. This differential positioning of the table 67 is effected in the following manner: As will be recalled from the foregoing description the rack segment 21 is adjusted to a position corresponding to the key 20 which has been depressed. In the modification it is planned to assign the eight upper keys of one bank of keys 20 to the different segregations indicated on the sales slip, which the lower key is assigned to the total printing operation. The particular rack segment 21 is extended to form almost a continuous gear and its lower edge is formed with teeth 132 which are constantly in mesh with a pinion 133 meshing with a pinion 134 mounted on the shaft 69. Thus a differential adjustment of the rack segment 21 will effect a differential rotation of the shaft 69. This, as will readily be seen, will result in a differential positioning of the printing table 67 in correspondence with the key which was depressed, as the shaft 69 is the shaft which was described as being under control of the lever 51 and which transmitted the differential adjustment of said lever to the printing table. In order to give the shaft 118 its rocking movement to disable the broad pinions 36 while the total printing is being effected, there is provided a lever 135 loosely mounted on the shaft 69. The lever 135 is arranged just beside the bank of department keys and at its upper end is formed with a notch which is adapted to coöperate with the pin 136 of the lowermost key of the bank. Thus when the lowermost key is depressed its pin 136 will engage the notch formed in the upper end of said lever 135 and will cause said lever to rock rearwardly at its upper end. This rocking movement of the lever 135 is transmitted to the shaft 118 through a link 137 and an arm 138 rigidly carried by the shaft 118. It will be seen that the mechanism just described has the effect of rocking the shaft 118 to disable the broad pinion 36 in the same manner as did the pin 111, carried by the lever 51, and the sliding plate 113 and arm 117.

Fig. 10 shows a modification of the mechanism for resetting the main totalizer to zero when the lever 51 of the total key of the department bank shown in Fig. 9 is adjusted to effect a printing of the total. This mechanism comprises an arm 139 rigidly mounted on the shaft 118 and connected by a link 140 to one arm of a bell crank lever 141 pivoted upon the shaft 142 which supports the main operating handle. Bell crank 141 carries at its upper arm a broad pinion 103, shown in Fig. 6 as extending across the face of the two gears 104 and 105. The gears 104 and 105 are of the same construction as the gears shown in said Fig. 6, the gear 105, however, meshing with a gear 143 rigidly connected to a large gear 144 of the main operating train. The gears 144 and 143 are so constructed with relation to the gear 105, as to cause a single rotation of the gear 105 at each operation of the machine. As before described, the shaft 118 is rocked whenever the total lever 51 is moved to total position, or the lowermost key of the bank of keys shown in Fig. 9 is depressed. With the present modification whenever said shaft 118 is rocked it causes rocking of the bell crank lever 141 to effect an engagement of the broad idle pinion 103 with the gears 104 and 105. Then when the machine is operated the gears 104 and 103 will cause a single rotation of the gear 105 and a consequent single rotation of the companion gear 104 and also of the "turn to zero" shaft 32, thus resetting the elements of the main totalizer to zero.

The general operation of the machine is as follows, supposing the machine to be designed for use in a wholesale store handling the different classes of business as indicated on the sales slip shown in Fig. 8. If a single transaction comprised a sale of different items such as cigars and tobacco, groceries, candies and sundries to the various amounts which have been shown on the sales slip, the complete entry of the transaction would be as follows. The salesman first moves the lever 51 to the position which has been assigned to cigars and tobacco, which as shown is the second position. He then depresses keys 20 representing the amount of that item of the transaction, which in the present case is $15.83. He then operates the machine and the amount of $15.83 is entered on the appropriate one of the item totalizers 48 and also upon the main totalizer. Simultaneous with the entry of such amount upon the appropriate item totalizer and the main totalizer, the amount is likewise printed upon the proper line of the sales slip just beside the printed item "Cigars and Tobacco" and also upon the detail strip 80 together with an initial or other mark to indicate on the record strip the segregation of the record. The operator then moves the lever to the position representing groceries, in the present instance the third position, and then depresses the keys representing the amount of $132.42. He then operates the machine and the amount stated is entered upon the appropriate item totalizer and also upon the main totalizer and is printed upon the sales slip and detail strip in a manner similar to the entry just above mentioned. He then moves the lever to the position for candies and goes through the same operation to record a sale of $5.90, and then moves the lever to sundries and records the amount of $2.00. Having recorded all the items of the transaction he then refers to the main totalizer and ascertains the total amount of the transaction. A movement of the lever 51 to its total position brings the grand total totalizer in operative position and he then depresses the keys 20 to represent the total shown by the main totalizer, which in the present instance is $156.13. An operation of the machine causes the amount of $156.13 to be entered upon the grand total totalizer, and simultaneously with the entry of this amount upon said totalizer the main totalizer is reset to zero automatically and the amount of the total printed in the proper line on the sales slip and also upon the detail strip. Simultaneously with such printing of the total, the date and also the consecutive number of the transaction are printed at the proper point on the sales slip.

It will thus be seen that by the use of the present machine the proprietor of a wholesale house is able to tell at all times the amount of sales in each segregation of transactions and also, by referring to the grand total totalizer, he is able to tell the total amount of all such sales.

While the form of mechanism herein shown and described is admirably adapted to fulfil the objects primarily stated, it is to be understood that it is not intended to confine the invention to the one form of embodiment herein shown and described but that it is susceptible of embodiment in various forms all coming within the scope of the claims which follow.

What is claimed is:—

1. In a cash register, the combination with a main operating mechanism, a main totalizer, and mechanism for resetting the latter to zero, of a series of auxiliary totalizers operable singly, means for selecting the auxiliary totalizer to be actuated and means controlled by said selecting means for rendering the turn to zero mechanism operative on the selection of a certain one of said auxiliary totalizers.

2. In a cash register, the combination with a main operating mechanism, a main totalizer, and connections intermediate said mechanism and main totalizer for resetting the latter to zero upon certain operations of the former; of a series of auxiliary totalizers arranged to be selected for operation and means for rendering said resetting connections operative to reset the main totalizer upon the selection of a certain one of said auxiliary totalizers.

3. In a cash register, the combination with a main operating mechanism, a main totalizer and connections intermediate said mechanism and main totalizer for resetting the latter to zero upon certain operations of the former; of a series of auxiliary totalizers, means for selecting any desired ones of said auxiliary totalizers for operation, and devices operated by the selecting means on the selection of a certain one of the auxiliary totalizers for rendering the resetting connections operative on an operation of the main operating mechanism.

4. In a cash register, the combination with a main operating mechanism, a main totalizer and connections intermediate said mechanism and main totalizer for resetting the latter to zero upon certain operations of the former; of a series of auxiliary totalizers, a single actuating mechanism common to all of the auxiliary totalizers, manipulative means for establishing a coöperative relation between the actuating mechanism and any of said auxiliary totalizers and means controlled by said manipulative means for rendering the resetting connections effective when a certain one of said auxiliary totalizers is in operative position.

5. In a cash register, the combination with a main operating mechanism; of a plurality of totalizing pinions; corresponding actuating gears for each pinion; a single rotatable shaft on which said totalizing pinions and said actuating gears are mounted; a coupling pinion controlled by said operating mechanism for coupling a corresponding totalizing pinion and gear together during an adding operation; connections intermediate the shaft and the totalizing pinions for resetting the latter to zero upon the rotation of the former; a pair of gears one of which is loose and the other fast on said shaft; connections intermediate the one gear loose on the shaft and said operating mechanism for rotating said gear at each operation of the machine; a second coupling pinion; and manipulative means for moving said second coupling pinion to connect the pair of gears so that rotation of the gear loose on the shaft rotates said shaft to turn the totalizer pinions to zero.

6. In a cash register, the combination with a main operating mechanism, of a main totalizer comprising a plurality of totalizing elements, and a rotatable shaft on which the totalizer is mounted adapted when rotated to reset the totalizing elements to zero, means intermediate the shaft and main operating mechanism capable of rotating the shaft upon certain operations of the main operating mechanism, a series of auxiliary totalizers, means for selecting any desired ones of said auxiliary totalizers for operation and devices for rendering the intermediate means effective to rotate the shaft on the selection of a certain one of the auxiliary totalizers.

7. In a cash register, the combination with a main totalizer and mechanism for resetting the same to zero; of means for printing items of record, a movable record material carrying table capable of differential adjustment to cause a printing of the items at any point on the record material, and means for rendering the resetting mechanism effective when the table is in a certain position of adjustment.

8. In a cash register, the combination with a main operating mechanism, a totalizer and connections intermediate said mechanism and totalizer for resetting the latter to zero upon certain operations of the former; of means for printing items of record, a movable record material carrying table capable of differential adjustment relative to the printing means to cause a printing of the items at any point on the record material, and means controlled by the adjustment of the table for rendering the resetting connections effective when the table is in a certain position of adjustment.

9. In a cash register, the combination with a main operating mechanism, a totalizer and connections intermediate said mechanism and totalizer for resetting the latter to zero upon certain operations of the former; of means for printing items and totals of record, a movable record material carrying table capable of differential adjustment relative to the printing means to cause a printing of items and a total at desired points on the record material, and means for rendering the resetting connections effective when the table is in total printing adjustment.

10. In a cash register, the combination with means for printing details of transactions and a movable record material carrying table capable of differential adjustment relative to the printing means to cause printing of details at any desired point on the record material, of an auxiliary printing device and means for rendering it operative when the table is in a certain one of its adjusted positions.

11. In a cash register, the combination with means for printing details of transactions, impression means for taking an impression therefrom and a movable record material carrying table capable of differential adjustment relative to said printing and impression means, of an auxiliary printing device, impression means therefor and means for rendering the latter impression means operative only when the table is in a certain position of adjustment.

12. In a cash register, the combination with means for printing details and totals of transactions, and a movable record material carrying table capable of adjustment relative to the printing means to cause a printing of details and totals at any desired point on the record material, of an auxiliary printing device, and impression means for the auxiliary printing device carried by the table and brought into coöperative relation with the auxiliary printing device only when the table is in total printing position.

13. In a cash register, the combination with an operating mechanism, of a plurality of totalizers, one of said totalizers being mounted on a shaft constructed to reset the totalizer by rotation, and totalizer selecting mechanism controlling means for rotating the shaft.

14. In a cash register, the combination with means effecting a segregation of records therein, a main totalizer, and mechanism for resetting the same to zero under control of the segregating means.

15. In a cash register, the combination with manipulative means controlling the operations thereof, of a main totalizer, mechanism for resetting the same to zero, and connections for rendering the resetting mechanism effective on certain manipulations of the manipulative means.

16. In a cash register, the combination with a main operating mechanism, of a main totalizer, connections intermediate said mechanism and main totalizer for resetting the latter to zero upon certain operations of the former; means effecting a segregation of records within the register and mechanism under control of the segregating means for rendering the resetting connections effective.

17. In a cash register, the combination with a main operating mechanism, of a main totalizer, connections intermediate said mechanism and main totalizer for resetting the latter to zero upon certain operations of the former; manipulative means for controlling the operations of the register and means for rendering the resetting connections effective on certain manipulations of the manipulative means.

18. In a cash register, the combination with a plurality of totalizers, of totalizer actuating mechanism, resetting mechanism for one of said totalizers, means for establishing operative relationship between any desired totalizer and the actuating mechanism, and connections whereby said means adjusts said resetting mechanism for operation.

19. In a cash register, the combination with totalizer operating mechanism, of a frame movable differentially with respect to the operating mechanism, item totalizers mounted in permanent fixed relation to said frame, printing mechanism and a slip supporting table constructed to hold the slip from movement thereon movable differentially with respect to the printing mechanism, and connected to said frame to be moved corresponding extents.

20. In a cash register, the combination with type carriers, of a plurality of item accumulators, means for differentially setting the type carriers and operating the accumulators, accumulator selecting mechanism, and a slip carrying table constructed to hold the slip in a fixed and invariable position thereon and movable relatively of the type carriers by said selecting mechanism.

21. In a cash register, the combination with type carriers, of a plurality of item accumulators, a total accumulator, means for differentially setting the type carriers and operating the accumulators, accumulator selecting mechanism, and a slip carrying table constructed to hold the slip thereon in a fixed and invariable position and movable relatively of the type carriers by said selecting mechanism.

22. In a cash register, the combination with printing mechanism, of a differentially movable paper support, an impression device movable with said support and constructed to be operative when the paper support is in a certain predetermined position.

23. In a cash register, the combination with printing mechanism, of a differentially movable paper support, and an impression device constructed to be operative when the paper support is in a certain predetermined position.

24. In a cash register, the combination with a totalizer operating mechanism; of a frame movable differentially with respect to the operating mechanism; item totalizers mounted in permanent fixed relation to said frame; printing mechanism; and a slip supporting table movable differentially with respect to the printing mechanism and at right angles to the printing line thereof, and connected to said frame to be moved correspondingly extents.

25. In a cash register, the combination with type carriers; of a plurality of item accumulators; means for differentially setting the type carriers and operating the accumulators; accumulator selecting mechanism; and a slip carrying table movable relatively to the type carriers and at right angles to the printing line thereof by said selecting mechanism.

26. In a cash register, the combination with means effecting a segregation of records therein; a grand total totalizer selected for actuation by the segregating means; a main totalizer; and mechanism for setting the latter to zero and rendered operative for such purpose whenever the grand total totalizer has been selected for actuation.

27. In a cash register, the combination with a main operating mechanism; of a main totalizer; connections intermediate said mechanism and main totalizer for resetting the latter to zero upon certain operations of the former; means effecting a segregation of records within the register; a grand total totalizer selected for actuation by said segregating means; and mechanism under control of the segregating means for rendering the resetting connections effective whenever said grand totalizer has been selected for actuation.

28. In a cash register, the combination with a plurality of auxiliary totalizers and a main totalizer; of actuating means therefor; means for establishing such a relation between the accounting means and any one of the auxiliary totalizers and the main totalizer that the amount added on any one of the auxiliary totalizers will be entered on the main totalizer; another totalizer; and means for resetting the main totalizer to zero and constructed to be operated for such a purpose whenever said last totalizer is actuated.

29. In a cash register, the combination with means for printing items of record; of a movable record material carrying table capable of differential adjustment relative to said printing means; manipulative means controlling the operation thereof; a main totalizer; mechanism for resetting the latter to zero; and connections for rendering the resetting mechanism effective on certain manipulations of the manipulative means.

30. In a cash register, the combination with a main totalizer; of a resetting mechanism therefor; means for printing items of record; a movable record material carrying table capable of differential adjustment relative to the printing means to cause a printing of the items at any line on the record material; manipulative means controlling movement of said table; and means controlled by the adjustment of said table for rendering the resetting means effective when the table is in a certain position of adjustment.

31. In a machine of the class described, the combination with a main operating mechanism, of a main totalizer, mechanism for setting said totalizer at zero, a series of auxiliary totalizers, a set of actuators common thereto, means for establishing coöperative relationship between any desired totalizer and the actuators, and devices controlled by said means for determining whether the aforesaid zero setting mechanism is to be effective at an operation of the main operating mechanism.

32. In a machine of the class described, the combination with a main operating mechanism, of a main totalizer, zero setting mechanism therefor, printing mechanism comprising a differentially movable support for record material, means for differentially moving said support, and devices controlled by said means for determining whether the aforesaid zero setting mechanism is to be effective at an operation of the main operating mechanism.

In testimony whereof I affix my signature in the presence of two witnesses.

MAX JACOB.

Witnesses:
HENRY HASPER,
WOLDEMAR HAUPT.